(12) United States Patent
Smith et al.

(10) Patent No.: US 8,005,715 B2
(45) Date of Patent: Aug. 23, 2011

(54) DOMAINS TEMPLATE MANAGEMENT SYSTEM

(75) Inventors: Tony Smith, Waterville, OH (US); Michael Romoff, New York, NY (US); William A. Margiloff, New York, NY (US); Craig Pohan, Hoboken, NJ (US)

(73) Assignee: Innovation Interactive Inc., New York, NY (US)

( * ) Notice: Subject to any disclaimer, the term of this patent is extended or adjusted under 35 U.S.C. 154(b) by 562 days.

(21) Appl. No.: 11/405,100

(22) Filed: Apr. 17, 2006

(65) Prior Publication Data

US 2007/0244748 A1 Oct. 18, 2007

(51) Int. Cl.
*G06Q 30/00* (2006.01)
(52) U.S. Cl. .............. 705/14.25; 705/14.49; 705/14.53; 705/14.67
(58) Field of Classification Search ................... 705/10, 705/14, 26, 27, 14.49, 14.53, 14.67
See application file for complete search history.

(56) References Cited

U.S. PATENT DOCUMENTS

| | | | | |
|---|---|---|---|---|
| 5,918,014 | A * | 6/1999 | Robinson ................. 709/219 |
| 6,134,532 | A * | 10/2000 | Lazarus et al. ................. 705/14 |
| 7,039,599 | B2 * | 5/2006 | Merriman et al. ............. 705/14 |
| 7,523,087 | B1 * | 4/2009 | Agarwal et al. .................. 707/1 |
| 7,617,122 | B2 * | 11/2009 | Kumar et al. ............. 705/14.53 |
| 2003/0055816 | A1 * | 3/2003 | Paine et al. ...................... 707/3 |
| 2003/0220837 | A1 * | 11/2003 | Asayama ...................... 705/14 |
| 2004/0044565 | A1 * | 3/2004 | Kumar et al. .................. 705/14 |
| 2004/0249713 | A1 * | 12/2004 | Gross .............................. 705/14 |
| 2005/0240580 | A1 * | 10/2005 | Zamir et al. ..................... 707/4 |
| 2007/0208729 | A1 * | 9/2007 | Martino ........................... 707/5 |

\* cited by examiner

*Primary Examiner* — Raquel Alvarez
(74) *Attorney, Agent, or Firm* — Buckley, Maschoff & Talwalkar LLC

(57) ABSTRACT

According to some embodiments, systems, methods, and articles of manufacture are provided for a domains template management system. In some cases, a domain landing page may be presented to a plurality of users, and historical user action data associated with the landing page may be collected. A subsequent presentation of the landing page may then be dynamically adjusting based on the historical user action data.

12 Claims, 10 Drawing Sheets

DOMAINS TEMPLATE MANAGEMENT SYSTEM

FIELD

The present invention relates to the presentation of information via communication networks. In some embodiments, the layout of a domain landing page may be dynamically adjusted based on historical revenue and/or user related historical or related behavioral information associated with domain and/or page.

BACKGROUND

A business may present content, including advertisements, to users. For example, a business might receive advertisement information from merchants (e.g., text or image information) and in turn present advertisements to users, along with other content, via web pages. In this case, the merchant may provide payment to the business based at least in part on how many users viewed (and/or responded to) the advertisements.

For various reasons, users may respond to different layouts, combinations, and/or selections of advertisements in different ways. For example, displaying text advertisements above image advertisements might turn out to be less effective as compared to displaying them below. Similarly, placing one type of advertisement next to another type of advertisement might decrease user response to both advertisements. Also note that similar displays might be received differently depending on the type of user (e.g., the user's age and whether the user is male or female), the time of day, or any of a number of other factors. Because a business may receive payment based at least in part on user reaction to a display, it may be advantageous to select and/or adjust the display to improve user reaction. Manually monitoring user reaction to select and/or adjust an appropriate display, however, can be an inefficient process. This might be especially true when the business is associated with a substantial number of displays. Therefore an automated process to monitor and select the appropriate display that yields the highest net effective revenue may be desired.

DETAILED DESCRIPTION

Figure 1:
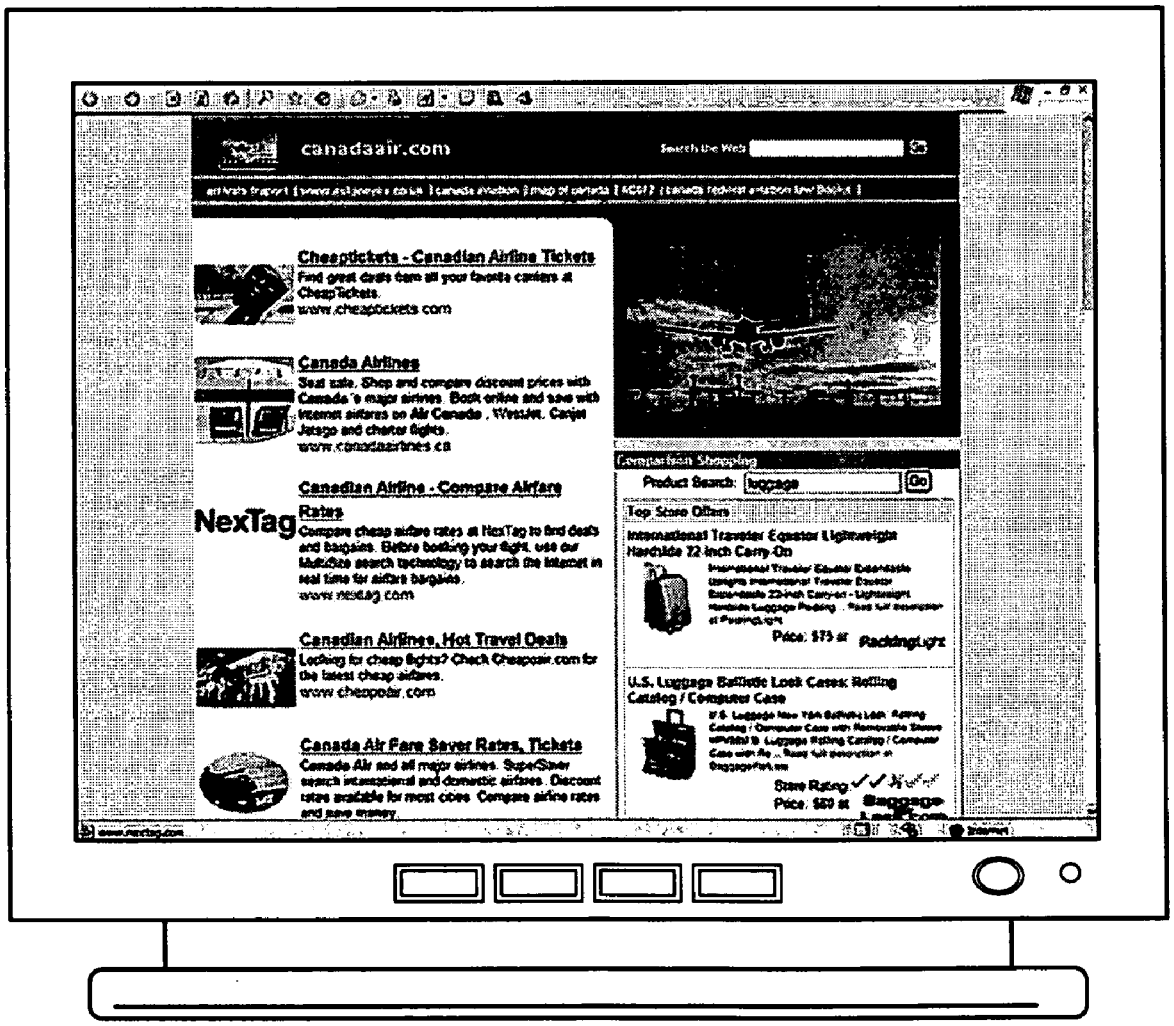
FIG. 1 illustrates a domain landing page display according to some embodiments of the present invention.

A "landing page" is the initial display that is provided to a user when he or she visits a particular domain. By way of example, FIG. 1 illustrates a domain landing page 100 that might be presented to a user who visits the Uniform Resource Locator (URL) address like www.canadaair.com via the Internet. Note that the page 100 might include advertisements (e.g., including text and image information) along with other content.

Figure 2:
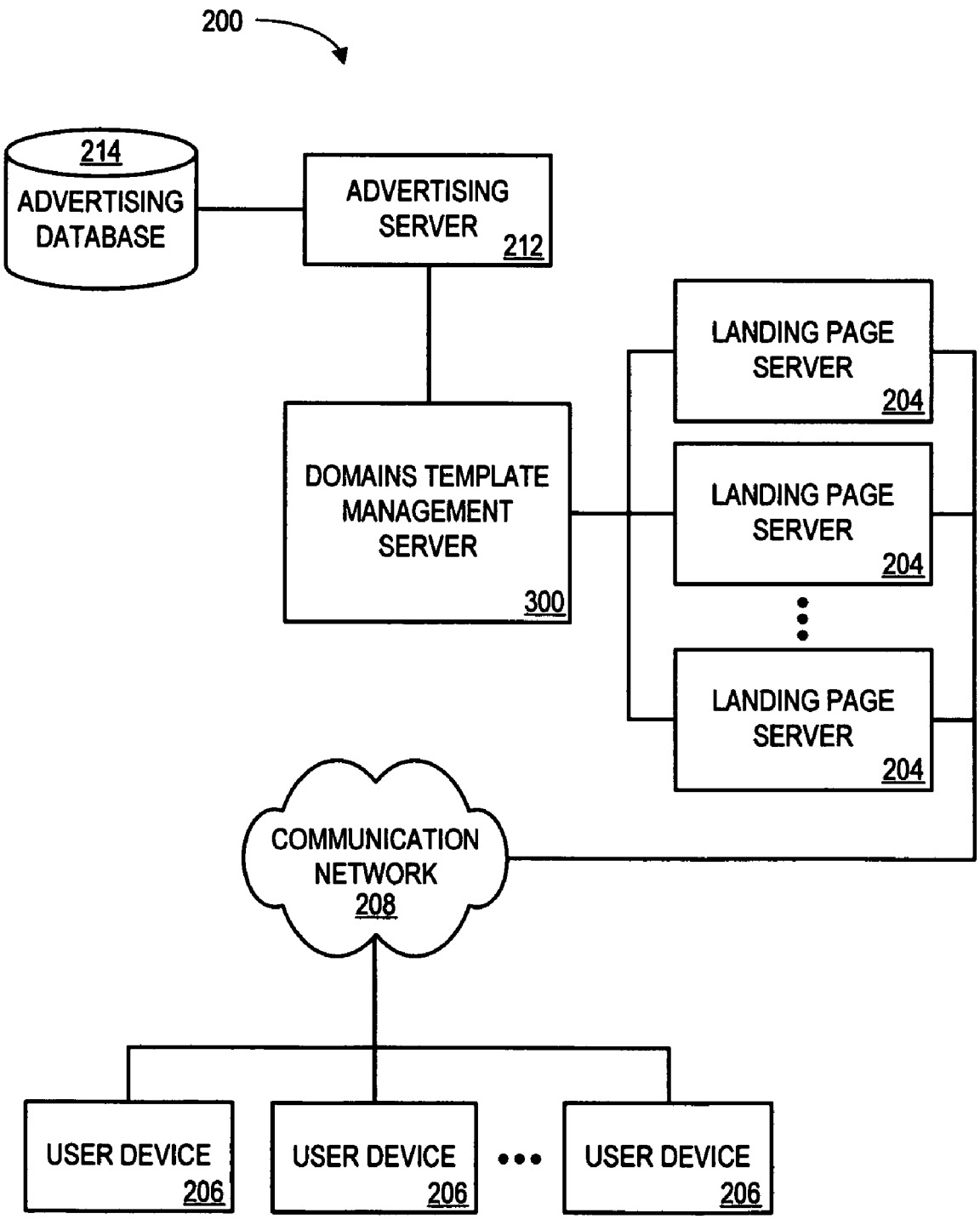
FIG. 2 is a block diagram of a system according to some embodiments of the present invention.

FIG. 2 is a block diagram of a system 200 that may be used to facilitate the creation and/or display of such a landing page 100 according to some embodiments of the present invention. The system 200 illustrated in FIG. 2 is depicted for use in explanation, but not limitation, of described embodiments. Different types, layouts, quantities, and configurations of systems may be used. The system 200 may be associated with, for example, the methods described in conjunction with FIGS. 5 and 9 herein.

In some embodiments, the system 200 may include a landing page server 204 and a user device 206. Moreover, an advertising server 212 may, for example, a device used or operated by and/or on behalf of an advertiser. In some embodiments, the advertiser may wish to display one or more advertisements on a landing page for viewing by a user operating a user device 206. The landing page may be operated, owned, affiliated with, and/or operated by, for example, a business running a number of landing page servers 204. According to some embodiments, the landing page server 204 may provide the advertisement to the user device 206 via a communication network 208. The advertisement may be provided in connection with a landing page which the user device 206 may access, for example, via a communication network 208 such as the Internet.

The system 200 may, according to some embodiments, include a Domains Template Management Server (DTMS) device 300. The DTMS device 300 may be, for example, a device that implements and/or is otherwise associated with the methods described in conjunction with FIGS. 5 and 9 herein.

In some embodiments, the DTMS device 300 may have access to, be, include, control, and/or otherwise be in communication with an advertising server 212. The advertising server 212 may, for example, be a server or other computer that provides advertisement information. In some embodiments, a landing page displayed on a user device 206 may contain information from or a link and/or other reference pointing to a location within the advertising server 212. The advertising server 212 may, for example, also be or include a web server and/or other web interface. In some embodiments, the advertising server 212 may be, include, and/or be in communication with an advertising database 214. For example, the DTMS device 300 may receive and store advertisement information from the advertising server or direct the advertising server 212 to send an advertisement to a landing page server 204 and/or a user device 206. The advertising server 212 may, according to some embodiments, retrieve information indicative of and/or associated with the requested advertisement from the advertisement database 214. The information may then be transmitted and/or provide to, for example, any of the landing page server 204, the DTMS device 300 and/or the user device 206.

As used herein, devices (such as the landing page servers 204 and the user device 206) may communicate via the communication network 208, such as a Local Area Network (LAN), a Metropolitan Area Network (MAN), a Wide Area Network (WAN), a proprietary network, a Public Switched Telephone Network (PSTN), a Wireless Application Protocol (WAP) network, a cable television network, or an Internet Protocol (IP) network such as the Internet, an intranet or an extranet. Note that the devices shown in FIG. 2 need not be in constant communication. For example, the user device 206 may only communicate with a landing page server 204 via the Internet on an as-needed basis. In some embodiments, for example, the user device 206 may be a Personal Computer (PC) that intermittently utilizes a dial-up connection to the Internet via an Internet Service Provider (ISP). In other embodiments the user device 206 may be in constant and/or high-speed communication with one or more landing page servers 204 (and/or with the DTMS device 300 or advertising server 212) through the use of any known or available connection device such as a cable or Digital Subscriber Line (DSL) modem. According to some embodiments, the communication network 208 may be or include multiple networks of varying type, configuration, size, and/or functionality. In some embodiments, any and/or all components of the system 200 may communicate via the communication network 208.

As shown in FIG. 2, multiple landing page servers 204 and/or user devices 206 may be included in system 200. Any number of the other devices described herein may also be included in the system 200 according to some embodiments. A single DTMS device 300 may, for example, be in communication with multiple advertising servers 212.

The various devices 204, 206, 300, 212 described herein may be any devices that are or become known or available and are capable of performing the various functions described herein. Each and/or every one of the devices 204, 206, 300, 212 may be, for example: a PC, a portable computing device such as a Personal Digital Assistant (PDA), an interactive television device, or any other appropriate storage and/or communication device.

Figure 3:
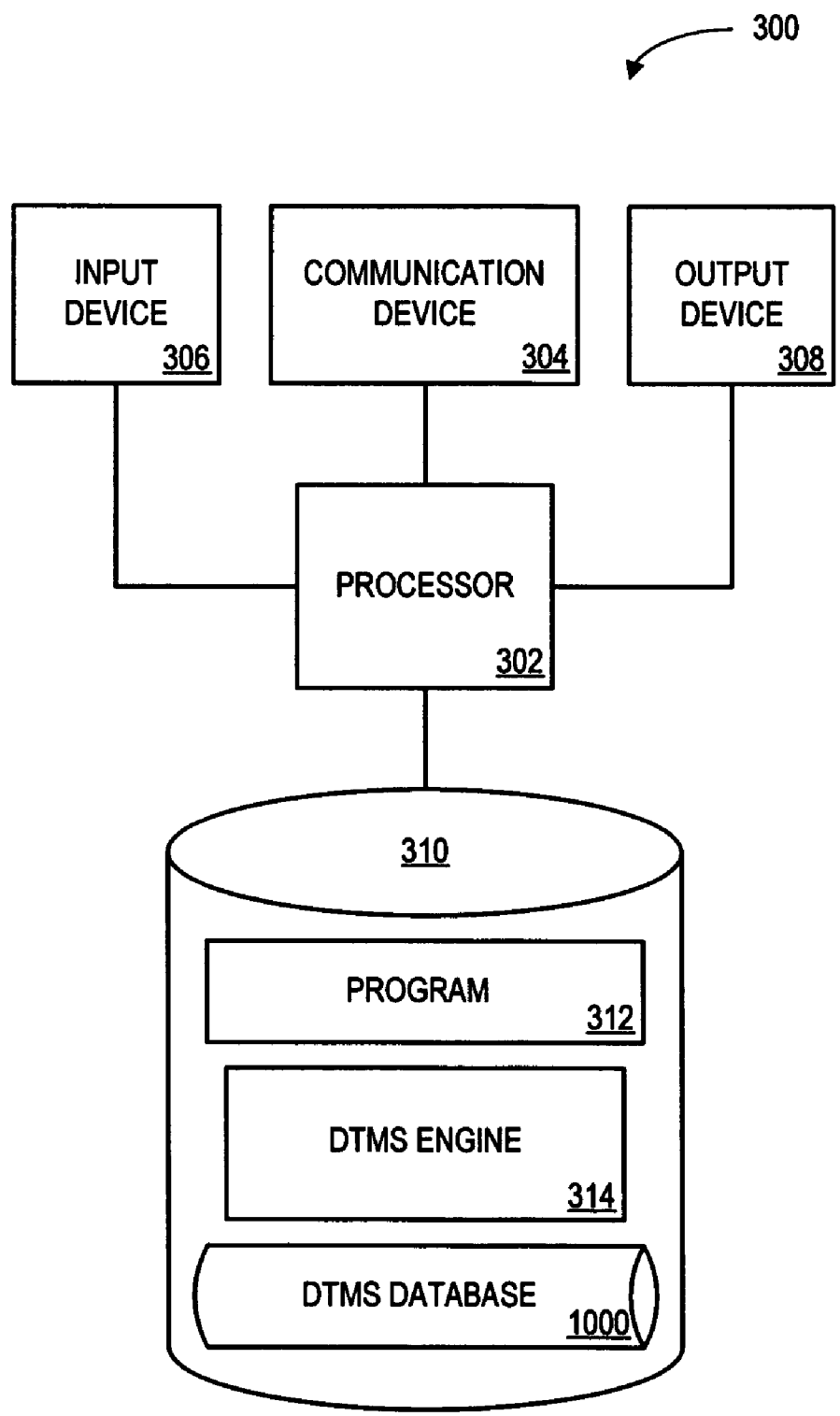
FIG. 3 is a block diagram of a domains template management server device according to some embodiments of the present invention.

FIG. 3 is a block diagram of the DTMS device 300 according to some embodiments of the present invention. The DTMS device 300 may, according to some embodiments, be associated with and/or perform the methods described in conjunction with FIGS. 5 and 9 herein. In some embodiments, fewer or more components than are shown in FIG. 3 may be included in the DTMS device 300. Also note that the DTMS device 300 might be associated with, for example, a PC, a wireless device (e.g., a wireless telephone or a handheld or laptop computer, a set-top box (e.g., associated with a media center), or a game device.

In some embodiments, the DTMS device 300 may include a processor 302, such as one or more Intel® Pentium® processors, coupled to a communication device 304 configured to communicate via a communication network (such as communication network 208 in FIG. 2). The communication device 304 may be used to communicate, for example, with one or more landing page servers 204 and/or advertising servers 212 as described in conjunction with the system 200 herein. The DTMS device 300 may further include an input device 306 (e.g., a mouse and/or keyboard) and an output device 308 (e.g., a computer and/or a television monitor).

As used herein, information may be "received" by or "transmitted" to, for example: (i) the DTMS device 300 from another system and/or device, and/or (ii) a software application or module within the DTMS device 300 from another system, software application, module, and/or any other source. For example, advertising information processed by the processor 302 may be sent via the communication device 304 to an advertising server 212 and/or a landing page server 204.

In some embodiments, the processor 302 may also communicate with a storage device 310. The storage device 310 may comprise any appropriate information storage device that is or becomes known or available, including, but not limited to, combinations of magnetic storage devices (e.g., a hard disk drive), optical storage devices, and/or semiconductor memory devices such as Random Access Memory (RAM) devices and Read Only Memory (ROM) devices.

The storage device 310 may, for example, store a program 312 for controlling the processor 302. The processor 302 may perform instructions of the program 312, and for example, thereby operate in accordance with embodiments described herein. The program 312 may be stored in a compressed, un-compiled and/or encrypted format. The program 312 may furthermore include other program elements, such as an operating system, a database management system, and/or device drivers used by the processor 302 to interface with peripheral devices. In some embodiments (such as shown in FIG. 3), the storage device 310 may also or alternatively store a DTMS engine 314.

In some embodiments, the DTMS engine 314 may, for example, arrange to present a domain landing page to a plurality of users via user devices 206 (e.g., via the landing page servers 204), wherein the landing page is constructed using a first template selected from a group of potential templates. The DTMS engine 314 might also collect historical revenue information associated with the landing page and determine information about a subsequent user by accessing information from a subsequent user device 206. The DTMS engine 314 might then dynamically select a second template from the group of potential templates to construct landing page for a subsequent presentation to the subsequent user based on both: (i) the historical revenue information and (ii) the information about the subsequent user. In this way, the constructed landing page may be presented to the subsequent user via the subsequent user device 206. Note that the DTMS device 300 may facilitate presentation of landing pages associated with a substantial number of domains (e.g., pages associated with 10,000 or more domains).

Figure 4:
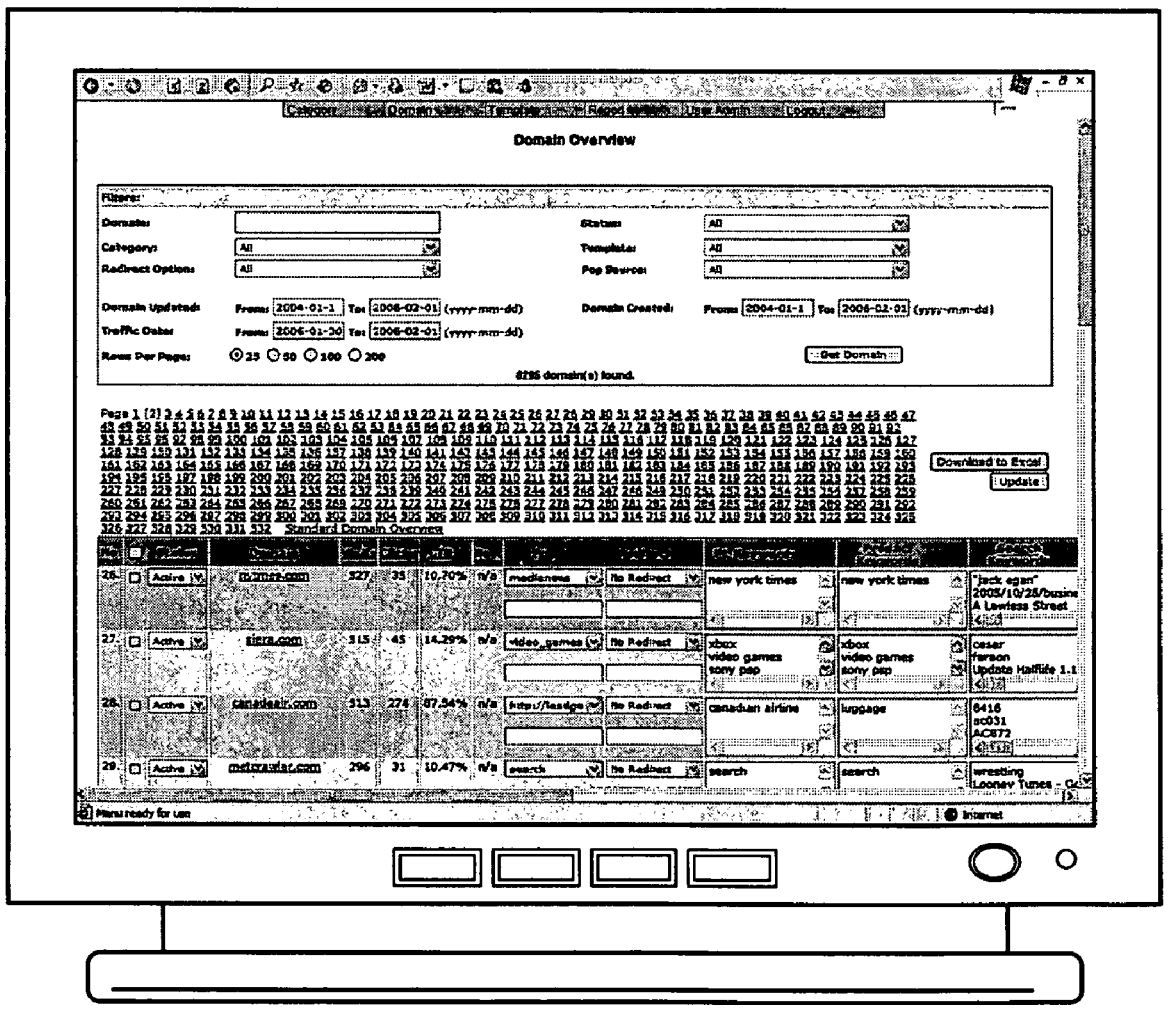
FIG. 4 illustrates a domains template management server display according to some embodiments of the present invention.

According to some embodiments, the DTMS engine 314, the input device 306, and/or the output device 308 may be used to control operation of the DTMS device 300 via a Graphical User Interface display. FIG. 4 illustrates one such GUI display 400 according to some embodiments of the present invention. In some embodiments, the display 400 may be associated with an operating system and may include a desktop and/or a task bar. The operating system may be any operating system that is or becomes known or available, such as any of the Windows™ Operating Systems provided by the Microsoft® Corporation. The display might be used, for example, to view and/or modify information in the DTMS database 1000 described with respect to FIG. 10.

Figure 5:
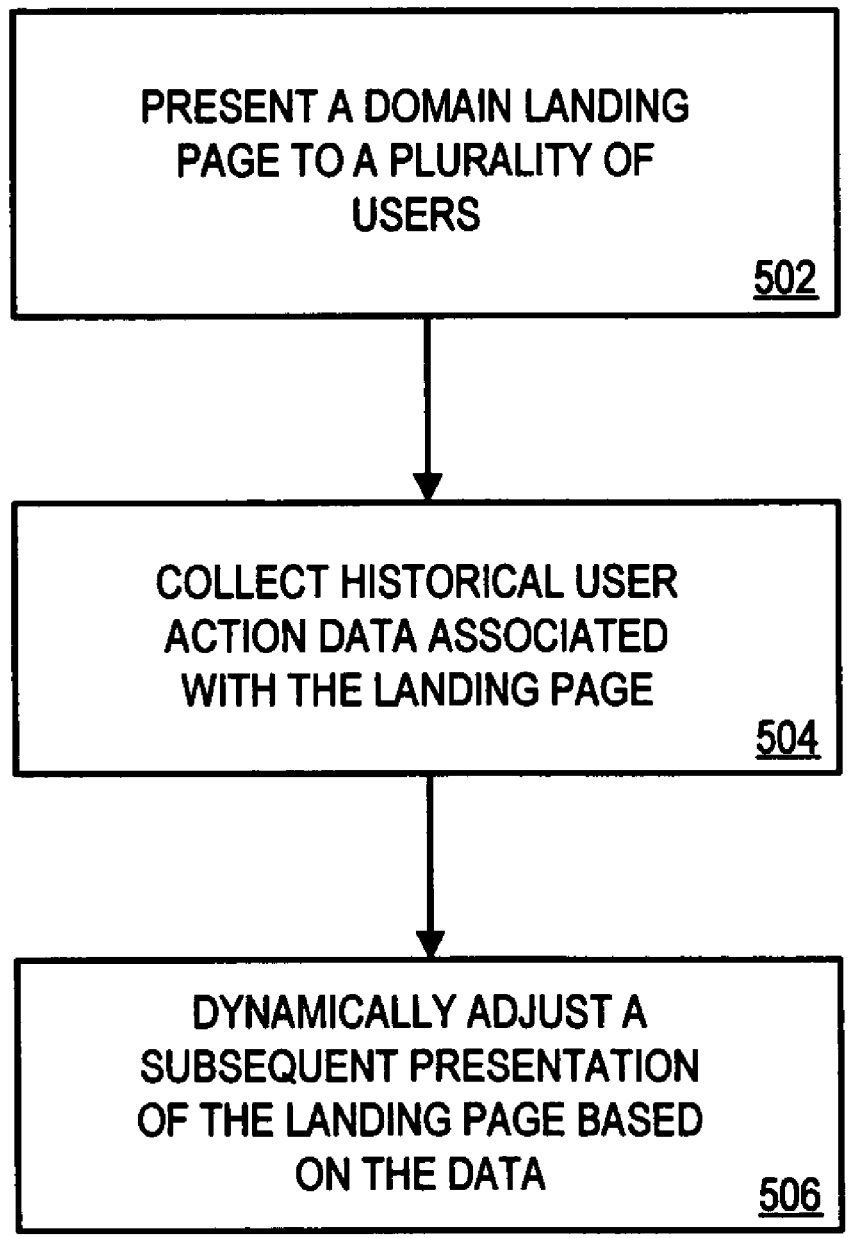
FIG. 5 is a flow chart of a method according to some embodiments of the present invention.

FIG. 5 is a flow chart of a method according to some embodiments of the present invention. The method 500 may be associated with and/or performed by, for example, the DTMS device 300 (or one or more of the system components) described in conjunction with any of FIGS. or 3 herein. The flow diagrams described herein do not necessarily imply a fixed order to the actions, and embodiments may be performed in any order that is practicable. Note that any of the methods described herein may be performed by hardware, software (including microcode), firmware, or any combination thereof. For example, a storage medium may store thereon instructions that when executed by a machine result in performance according to any of the embodiments described herein.

The method may begin, for example, by presenting a domain landing page to a plurality of users at 502. For example, a user who accesses the network URL address of "www.fancyflowers.com" might be presented with a particular landing page (e.g., including advertisements and other content associated with flowers). Note that other approaches may result in a display of a particular landing page. For example, a user who enters the term "flowers" into a particular search engine might be directed to an appropriate landing page.

At 504, historical user action data associated with the landing page may be collected. In some cases, the historical user action data will include revenue information. By way of examples only, revenue information might be associated with Revenue Per Thousand views (RPM) information, Cost Per Advertisement (CPA) information, Cost Per Click (CPC) information, Cost Per Thousand views (CPM) information, Click Through Rate (CTR) information, Cost Per Sale (CPS) information, and/or Cost Per Lead (CPL) information.

According to some embodiments, subsequent user data may also be collected. The subsequent user might, for example, access the landing page via direct navigation (e.g., or she might type the URL directly into a web browser address bar). Note, however, that the subsequent user might access the landing page in any of a number of different ways. For example, the subsequent user might access the landing page via purchased media (e.g., pop-up or banner advertisements) or via an optimized search engine result. The subsequent user data might, for example, be associated with other landing pages that the subsequent user had previously visited. According to some embodiments, the subsequent user data is retrieved from a file stored at a subsequent user device (e.g., a web browser cookie file stored at his or her PC).

Figure 6:
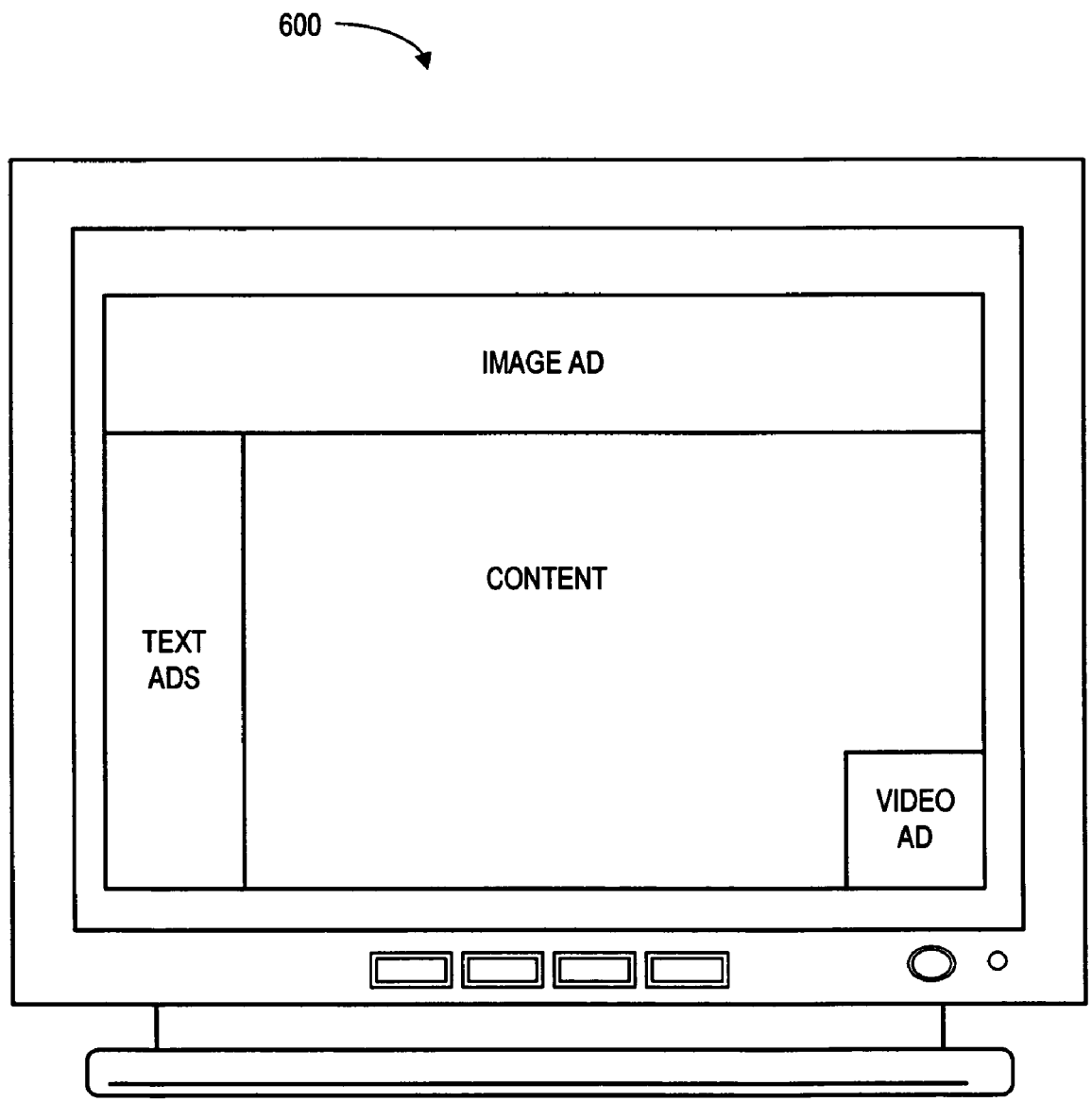
FIGS. 6 through 8 illustrate displays created using various templates according to some embodiments of the present invention.
Figure 7:
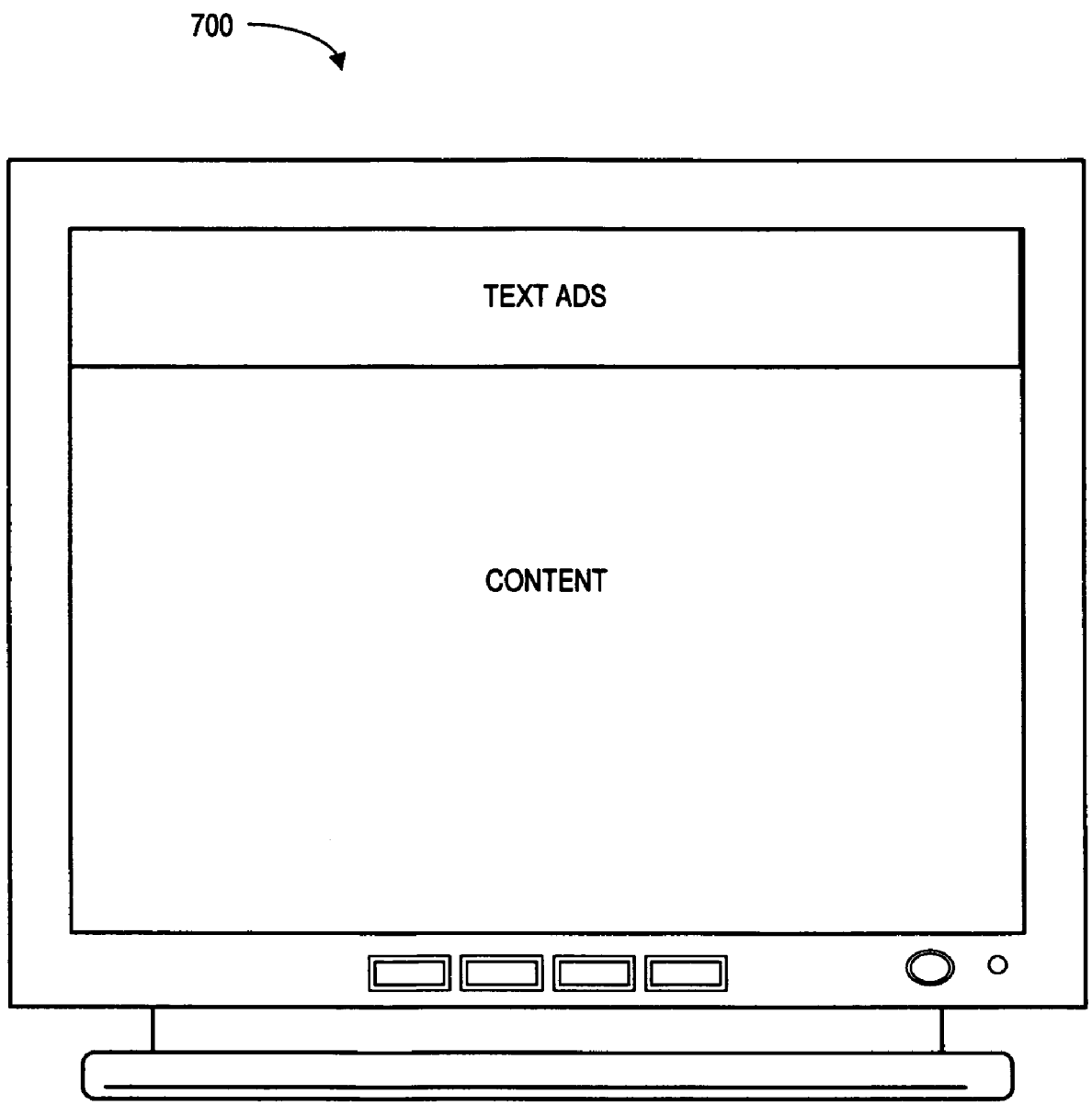
Figure 8:
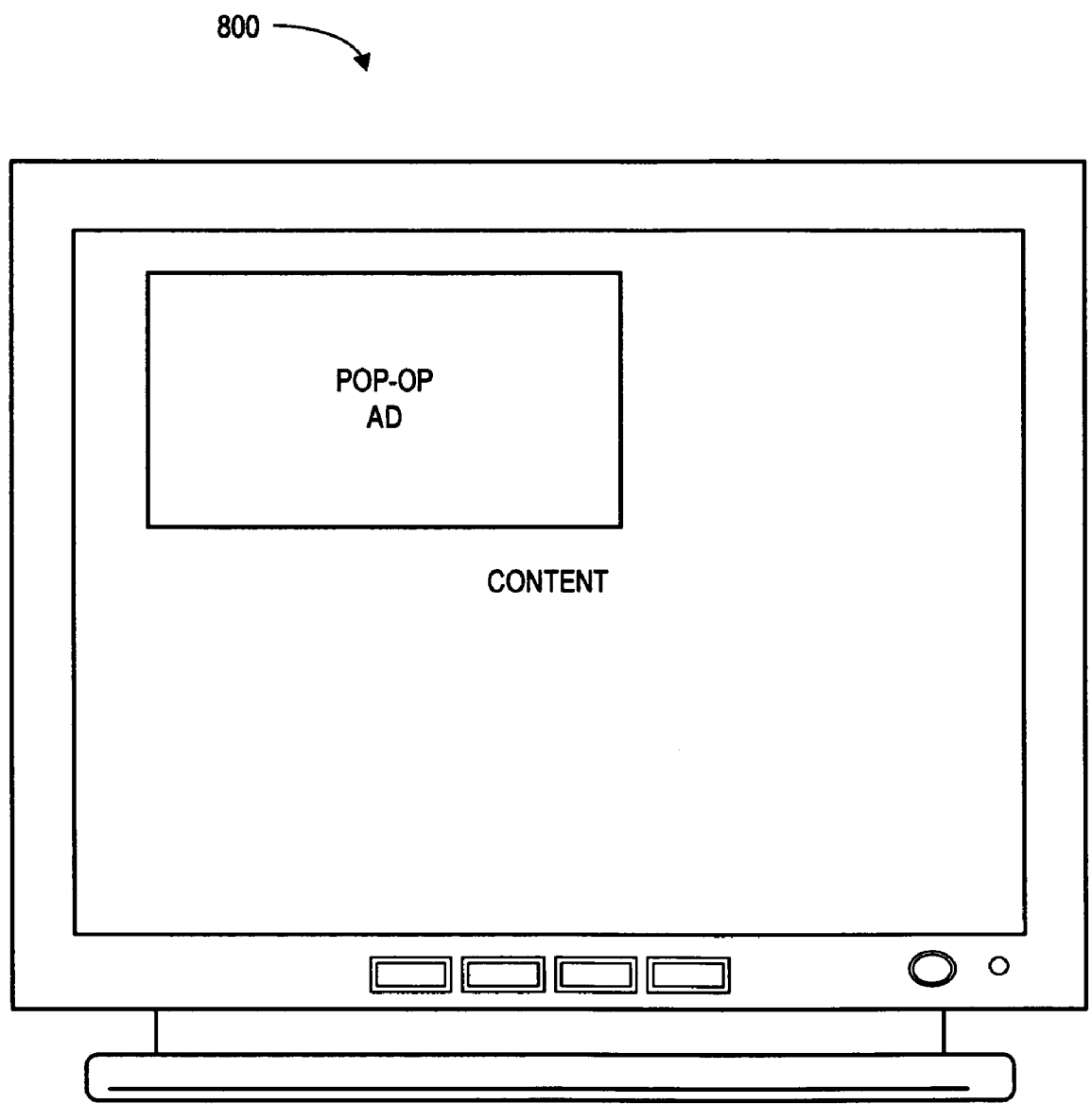

At 506, a subsequent presentation of the landing page may be dynamically adjusted based on the historical user action data and/or subsequent user data. For example, according to some embodiments, a landing page may be based on a "template," and each template might have a different "look and feel" as compared to other templates. Consider, for example, the template-based displays 600, 700, 800 illustrated with respect to FIGS. 6 through 8, respectively. Note that various templates might include text advertisements, image advertisements, video advertisements, pop-up advertisements, and/or other content configured in various ways. The displays 600, 700, 800 illustrated with respect to FIGS. 6 through 8 are merely exemplary and others template-based displays could be arranged in any number of other configurations. In this case, the "adjustment" at 506 might comprise the selection of different template from a set of potential templates. Note that different templates might include different Hyper-Text Markup Language (HTML) information (e.g., different HTML tags or elements). According to other embodiments, the HTML information may be directly adjusted (e.g., an advertisement area might be moved or made larger or smaller without selecting another template).

Another "adjustment made at 506 might comprise, for example, selecting at least one "advertisement" to be presented to a subsequent user. As used herein, the term "advertisement" may generally refer to any textual, audio, video, digital, and/or other form, type, or configuration of information. Advertisements may be presented to consumers or other users, for example, to provide information, promote and/or sell products or services, and/or otherwise to convey information to, collect information from, and/or communicate with another party, entity, and/or group or organization. In some embodiments, advertisements may include text, graphics, and/or interactive objects such as text boxes, check boxes, and/or command buttons.

As still another example, a landing page might be adjusted by altering an order in which information is presented to a subsequent user or changing at least one of: text information, graphical content, a location of information, a color associated with the landing page, audio information, video information, or a look and feel associated with the landing page.

Note that other information might also be used to determine how the landing page should be dynamically adjusted at 506, including a time of day, a day of week, a season (e.g., a holiday season), or an external event (e.g., an election or sporting event).

Also note that the method of FIG. 6 might be performed in connection with a plurality of domains. According to some embodiments, historical user action data associated with one domain is used to dynamically adjust a subsequent presentation of a landing page associated with another domain (e.g., information gathered from www.prettyflowers.com might be used to adjust the landing page associated with www.canadaair.com).

Figure 9:
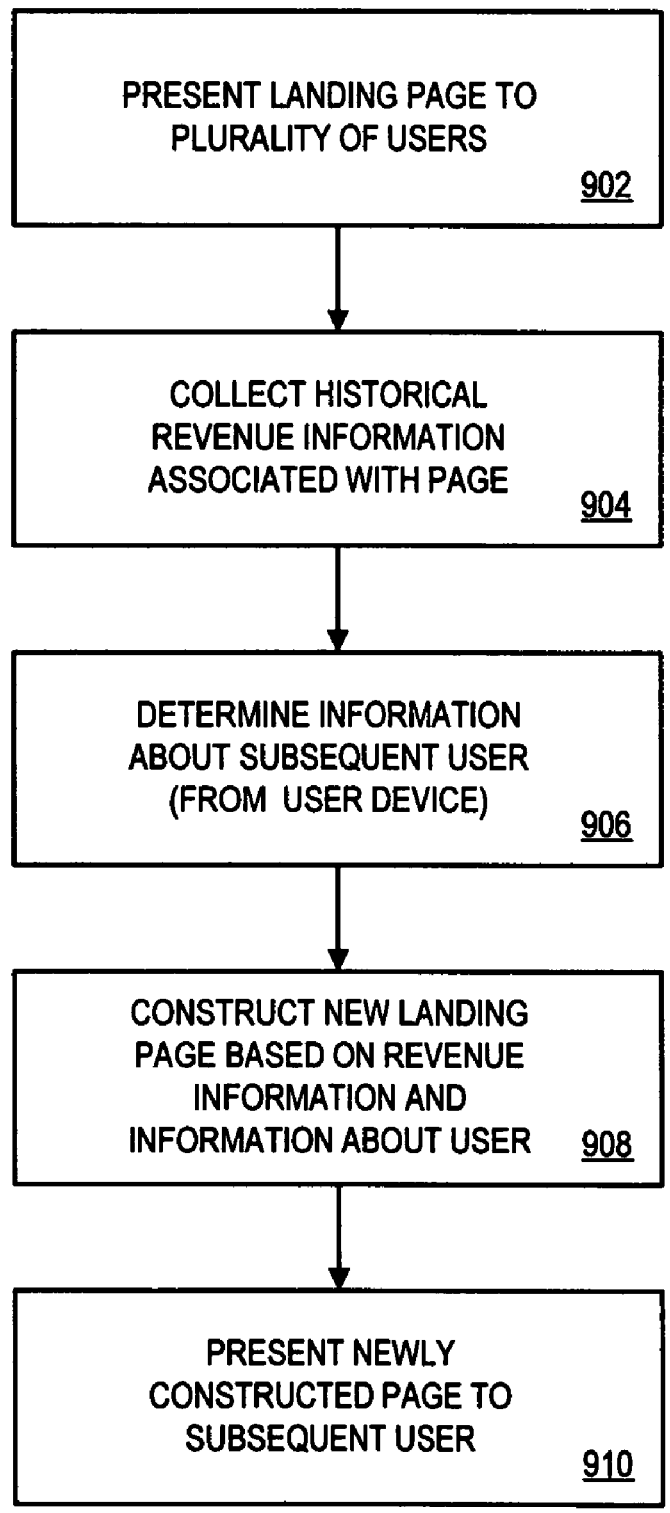
FIG. 9 is a flow chart of a method according to some embodiments of the present invention.

FIG. 9 is a flow chart of a method according to some embodiments of the present invention. As before, a domain landing page is presented to a plurality of users at 902. For example, the landing page might be constructed using a first template selected from a group of potential templates.

At 904, historical revenue information associated with the landing page may be collected. For example, the CTR of an advertisement having a particular CPC might be tracked.

Note that an adjusted landing page may eventually be presented to a subsequent user (e.g., with the hopes that the adjustments will improve the user's response to, and thus the revenue from, the page). According to some embodiments, the dynamic adjustment at 506 is further based on subsequent user data. According to this embodiment, information about a subsequent user may be determined at 906 by accessing information from a subsequent user device. For example, a cookie stored on a user device 206 might be considered when a new template is selected for the landing page. According to other embodiments, subscription information associated with a user might be used to select a new template. Some examples of user data might include, a user type (e.g., business person as compared to a student), a user location, a user browser, a user operating system, user demographic information, a user age, and/or a user language.

At 908, a new landing page may be constructed based on the revenue information and the information about the particular user who is accessing the domain. For example, the DTMS device 300 might dynamically select a second template from the group of potential templates to construct landing page for a subsequent presentation to the subsequent user.

At 910, the newly constructed landing page may be presented to the subsequent user. For example, the adjusted HTML information may be transmitted to the user device 206.

Figure 10:
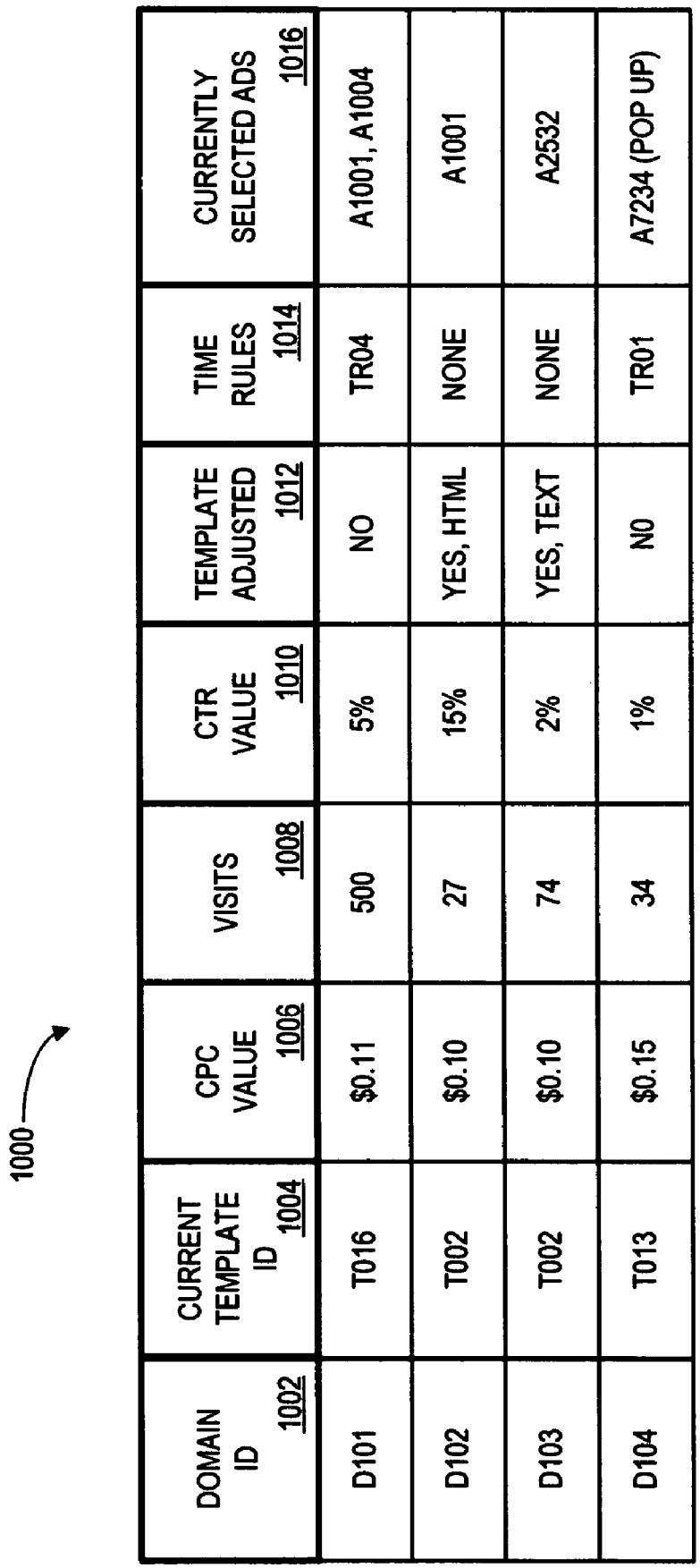
FIG. 10 is an exemplary domains template management server database table according to some embodiments of the present invention.

FIG. 10 is an exemplary DTMS database 1000 table according to some embodiments of the present invention. The information in the table 1000 may be created and updated, for example, based on information received from an advertisement server 212 (e.g., on a nightly basis) and/or user devices 206. The table 300 may include, for example, fields for: a domain identifier 1002, a current template identifier 1004, a CPC value 1006, a number of visits 1008, a CTR value 1010, template adjustments 1012, time rules 1014, and indications of currently selected advertisements 1016.

The domain identifier 1002 might be associated with, for example, a URL address or other information that can be identify or otherwise be associated with a particular landing page. The current template identifier 1004 may indicate which template was used to construct the current landing page.

The CPC value 1006, number of visits 1008, and CTR value 1010 might be used to determine revenue information. For example, with respect to domain identifier "D101" 5% of the 500 user visits (or 25) have resulted in a "click" on an advertisement. As a result, the revenue associated with that domain is $2.75. According to some embodiments, the number of visits 1008 may be used to determine when an adjustment to the landing page will be automatically performed (e.g., when the number of visits 1008 exceeds one thousand).

The template adjustments 1012 might indicate whether or not a landing page has been adjusted and/or the type of adjustment that was performed. The time rules 1014 might, for example, be an identifier associated with a particular rule (e.g., do not display a certain type of advertisement during the winter). The indications of currently selected advertisements 1016 might comprise, for example, an indication of which advertisements are currently being displayed on the landing page. Note that different advertisement might relate to different merchants and/or products (or the same merchants and/or products).

In some embodiments, the table 300 may contain any other information that is practicable for carrying out the embodiments described herein. For example, the table 300 may comprise a pointer indicating from where advertisement information (e.g., text, graphic, audio, and/or executable information) can be retrieved or may be or include the information itself. Other information such as one or more advertisement rules that indicate when an advertisement should be provided to a user (e.g., based on a keyword or URL), may also be stored. In some embodiments, the information stored in table 300 may take any form that is or becomes known or available and/or is described herein (e.g., in conjunction with any of the fields). Moreover, it should be understood that any combination of entities, values, variables, and/or metrics may be stored in the fields without deviating from some embodiments.

The following illustrates various additional embodiments. These additional embodiments do not constitute a definition of all possible embodiments, and those skilled in the art will understand that many other embodiments may be possible and/or practicable. Further, although the following embodiments are briefly described for clarity, those skilled in the art will understand how to make any changes, if necessary, to the above-described apparatus and methods to accommodate these and other embodiments and applications.

According to some embodiments, an adjustment may be made to a landing page after a pre-determined number of presentations to a user (or a pre-determined number of user actions). According to any of the embodiments, however, the adjustments may be made on any other basis. For example, an adjustment may be made each time a user accesses a domain or on a periodic basis (e.g., a batch of adjustments may be made each night).

In addition, user information was described as being used to adjust a presentation associated with that particular user. According to some embodiments, however, information about a first user might be used to adjust the presentation of a landing page for another user. For example, if 95% of users at a particular domain are women on a certain day, the landing page might be adjust that night based on that information. That is, the landing page presented to users the next day might have been adjusted with the expectation that the users who visit that domain will be more likely to women.

The present invention has been described in terms of several embodiments solely for the purpose of illustration. Persons skilled in the art will recognize from this description that the invention is not limited to the embodiments described.

What is claimed is:

1. A method, comprising:
   presenting a first domain landing page associated with a first domain to a first plurality of users, wherein the first domain landing page is presented in accordance with a first template of a set of potential templates, wherein different templates in the set of potential templates represent different layout presentations of a plurality of elements of landing page content;
   presenting a second domain landing page associated with a second domain to a second plurality of users, wherein the second domain landing page is presented in accordance with a second template of the set of potential templates;
   presenting the first domain landing page associated with the first domain to a third plurality of users, wherein the first domain landing page is presented in accordance with the second template;
   collecting historical revenue data associated with the first template and the first and third plurality of users;
   collecting historical revenue data associated with the second template and the second plurality of users;
   collecting user data associated with a particular user via a cookie stored at a user device of the particular user; and
   determining that the particular user is accessing the first domain landing page;
   selecting a template for the particular user from the set of potential templates based on (1) the historical revenue data associated with the first and second templates and (2) the user data; and
   dynamically adjusting a presentation of the selected template for the first domain landing page to the particular user based on (1) the historical revenue data associated with the selected template and (2) the user data.

2. The method of claim 1, wherein the historical revenue data comprises a cost-per-click.

3. The method of claim 2, wherein the historical revenue data further includes at least one of: (i) revenue per thousand views information, (ii) cost per advertisement information, (iii) cost per thousand advertisements information, (iv) click through rate information, (v) cost per sale information, and (vi) cost per lead information.

4. The method of claim 1, wherein said adjusting includes, for the selected template, dynamically changing at least one of: (i) hypertext markup language information, (ii) a tag, or (iii) an element.

5. The method of claim 1, wherein said adjusting includes dynamically selecting at least one advertisement to be presented to the particular user.

6. The method of claim 1, wherein said adjusting includes dynamically altering an order in which information is presented to the particular user.

7. The method of claim 1, wherein said adjusting includes dynamically changing all of: (i) text information, (ii) graphical content, (iii) a location of information, (iv) a color associated with the landing page, and (v) a look and feel associated with the landing page.

8. The method of claim 1, wherein the user data includes at least one of: (i) a user type, (ii) a user location, (iii) a user browser, (iv) a user operating system, (v) user demographic information, (vi) a user age, or (vii) a user language.

9. The method of claim 1, wherein said dynamic adjustment is further based on at least one of: (i) a time of day, (ii) a day of week, or (iii) a season.

10. The method of claim 1, wherein the determining that the particular user is accessing the first domain landing page is associated with at least one of: (i) a keyword, or (ii) a search term; and further wherein the selection of the template is further based on the keyword or search term.

11. The method of claim 1, wherein said presenting includes displaying a web page associated with a uniform resource locator address of the domain.

12. A non-transitory medium storing instructions adapted to be executed by a processor to perform a method, said method comprising:
- presenting a first domain landing page associated with a first domain to a first plurality of users, wherein the first domain landing page is presented in accordance with a first template of a set of potential templates, wherein different templates in the set of potential templates represent different layout presentations of a plurality of elements of landing page content;
- presenting a second domain landing page associated with a second domain to a second plurality of users, wherein the second domain landing page is presented in accordance with a second template of the set of potential templates;
- presenting the first domain landing page associated with the first domain to a third plurality of users, wherein the first domain landing page is presented in accordance with the second template;
- collecting historical revenue data associated with the first template and the first and third plurality of users;
- collecting historical revenue data associated with the second template and the second plurality of users;
- collecting user data associated with a particular user via a cookie stored at a user device of the particular user; and
- determining that the particular user is accessing the first domain landing page;
- selecting a template for the particular user from the set of potential templates based on (1) the historical revenue data associated with the first and second templates and (2) the user data and
- dynamically adjusting a presentation of the selected template for the first domain landing page to the particular user based on (1) the historical revenue data associated with the selected template and (2) the user data.

* * * * *